(12) United States Patent
Griffin et al.

(10) Patent No.: US 8,601,553 B1
(45) Date of Patent: Dec. 3, 2013

(54) TECHNIQUES OF IMPOSING ACCESS CONTROL POLICIES

(75) Inventors: Robert W. Griffin, Hollis, NH (US);
Daniel V. Bailey, Pepperell, MA (US);
Joshua A. Rosenthol, Centreville, VA (US)

(73) Assignee: EMC Corporation, Hopkinton, MA (US)

( * ) Notice: Subject to any disclaimer, the term of this patent is extended or adjusted under 35 U.S.C. 154(b) by 643 days.

(21) Appl. No.: 12/826,481

(22) Filed: Jun. 29, 2010

(51) Int. Cl.
*G06F 7/04* (2006.01)

(52) U.S. Cl.
USPC ........ 726/5; 726/2; 726/3; 713/150; 713/168; 713/170; 709/227

(58) Field of Classification Search
USPC ........ 726/2, 3, 5; 713/150, 168, 170; 709/227
See application file for complete search history.

(56) References Cited

U.S. PATENT DOCUMENTS

| | | | | |
|---|---|---|---|---|
| 6,122,631 | A * | 9/2000 | Berbec et al. | 1/1 |
| 6,161,182 | A * | 12/2000 | Nadooshan | 713/172 |
| 6,374,402 | B1 * | 4/2002 | Schmeidler et al. | 717/167 |
| 7,290,279 | B2 | 10/2007 | Eun et al. | |
| 7,310,813 | B2 * | 12/2007 | Lin et al. | 726/3 |
| 7,924,709 | B2 * | 4/2011 | Lynn | 370/230 |
| 7,953,976 | B2 * | 5/2011 | Giles et al. | 713/168 |
| 8,103,871 | B2 * | 1/2012 | Giles et al. | 713/168 |

OTHER PUBLICATIONS

Naldurg, P., Schwoon, S., Rajamani, S., Lambert, J. "NETRA:: seeing through access control" FMSE '06 Proceedings of the fourth ACM workshop on Formal methods in security. 2006 pp. 55-66 [retreived from ACM database on Dec. 17, 2012].*

9.De Capitani di Vimercati, S., S. Paragoschi, and P. Samarati, "Access Control: Principles and Solutions." Software-Practice and Experience, vol. 33, No. 5, 2002, pp. 397-421. [retreived Wikey online Library database on Dec. 17, 2012].*

* cited by examiner

*Primary Examiner* — Saleh Najjar
*Assistant Examiner* — Jason Plotkin
(74) *Attorney, Agent, or Firm* — BainwoodHuang (57) ABSTRACT

A technique of imposing access control policies is presented. The technique comprises receiving a token which is associated with a datum by a tokenization server. The technique also includes generating an access control result based on at least a portion of the token. The technique further includes imposing a first access control policy which includes refraining from sending an access request to the tokenization server when the access control result has a first value and a second access control policy which includes sending an access request to the tokenization server, the access request being constructed and arranged to request access to the datum when the access control result has a second value which is different from the first value.

23 Claims, 6 Drawing Sheets

TECHNIQUES OF IMPOSING ACCESS CONTROL POLICIES

BACKGROUND

Tokenization technology aims to mask sensitive data like credit card and Social Security numbers. Existing systems that process data matching a particular format sometimes need to be prohibited from accessing the actual data. The data itself is replaced with a "token" that appears to be correctly formatted data, such as having a correct check digit. Based on the token value, a properly authorized system can look up the actual data.

An access control list (ACL), accessible to the Tokenization Server, can be used to determine systems that possess the proper authorization to receive the actual data. After checking credentials with the ACL, the Tokenization Server returns the genuine data to the properly authenticated and authorized system.

SUMMARY

In the current tokenization architecture, one can see the performance bottleneck imposed by the Tokenization Server. In a complex organization like a payment processor, for example, many systems may need to know if they are properly authorized to access data. It is therefore inefficient to require the Tokenization Server to service all ACL-related inquiries. Further, maintaining such an ACL related to a token externally to the token increases the risk that policies related to access will be ignored or inappropriately applied.

In contrast to the above-described system in which the Tokenization Server services all ACL-related inquiries, a technique of imposing access control policies is presented as an embodiment of a solution to the problem of reducing the risk of divergence between intended access privileges and those actually enforced. The technique includes receiving a token which is associated with a datum by a tokenization server. The technique also includes generating an access control result based on at least a portion of the token. The technique further includes imposing a first access control policy which includes refraining from sending an access request to the tokenization server when the access control result has a first value and a second access control policy which includes sending an access request to the tokenization server, the access request being constructed and arranged to request access to the datum when the access control result has a second value which is different from the first value.

Implementations are directed to the following.

The technique can further include imposing a third access control policy which includes sending an alert to the tokenization server, the alert being constructed and arranged to prevent access of the sensitive data by the computerized device when the access control result has a third value which is different from the first value and the second value.

The datum can be a credit card number satisfying a checksum. In this case, receiving the token which is associated with the datum can include acquiring, as at least a part of the token, a set of bits satisfying the checksum and including a first subset and a second subset, and performing a verification operation configured to verify that an operation of a hash function on the first subset reproduces the second subset. Furthermore, the set of bits further can include a set of hold bits, each hold bit in the set of hold bits having a value equal to a corresponding bit in the credit card number.

When the datum is a credit card number satisfying a checksum, performing the verification operation can include sub- dividing, based on a set of control bits within the set of bits, the set of bits into the first subset of the set of bits and the second subset of the set of bits. In this case, the set of control bits can be based on the access control result.

Generating the access control result based on at least the portion of the token can include deriving a set of bits from application of an algorithm to a part of the token and outputting the first value when the set of bits has indicated that the computerized device is not authorized to access the datum and otherwise outputting the second value. In this case, deriving the set of bits from application of the algorithm to the part of the token can include inputting a set of parameters including an identity bit string representing an identity of the computerized device into the algorithm and producing the set of bits from an output of the algorithm. In some situations, the set of parameters can further include a privilege bit string representing a set of privileges into the algorithm, each privilege in the set of privileges representing an action on the datum. In other situations, deriving the set of bits from application of the algorithm to the part of the token can further include maintaining, on the computerized device, a list including a set of entries, each entry including an identity and a set of privileges associated with the identity. Either way, outputting the first value when the set of bits has indicated that the computerized device is not authorized to access the datum can include generating a message by the client that the computerized device having an identity represented by the identity bit string is not permitted to receive the datum.

Applying the algorithm to the part of the token can include identifying a set of bits in the part of the token corresponding to a set of privileges in an entry in the maintained list, the set of bits being prespecified by the tokenization server, verifying whether the identity in the entry is the identity represented by the identity bit string and producing the set of bits to form an output of the algorithm. In this case, verifying whether the identity in the entry is the identity represented by the identity bit string can include forming a list of entries having a set of privileges corresponding to the identified set of bits in the part of the token, compiling a list of identities from the list of entries and verifying whether the identity represented by the identity bit string matches an identity in the list of identities.

A further embodiment to the stated problem is a computerized device configured to access control policies. The computerized device includes a memory, a network interface, and a processor. The processor is configured to receive a token which is associated with a datum by a tokenization server at the network interface. The processor is also configured to generate, apart from the tokenization server, an access control result based on at least a portion of the token. The processor is further configured to impose a first access control policy which includes refraining from sending an access request to the tokenization server when the access control result has a first value and a second access control policy which includes sending an access request to the tokenization server, the access request being constructed and arranged to request access to the datum when the access control result has a second value which is different from the first value.

Implementations are directed to the following.

Generating the access control result based on at least the portion of the token can include deriving a set of bits from application of an algorithm to a part of the token and outputting the first value when the set of bits has indicated that the computerized device is not authorized to access the datum and otherwise outputting the second value. In this case, deriving the set of bits from application of the algorithm to the part of the token can include inputting a set of parameters including an identity bit string representing an identity of the computerized device into the algorithm and producing the set of bits from an output of the algorithm. In some situations, the set of parameters can further include a privilege bit string representing a set of privileges into the algorithm, each privilege in the set of privileges representing an action on the datum. In other cases, the set of parameters can further include a cryptographic key that proves the identity of the computerized device. In other situations, deriving the set of bits from application of the algorithm to the part of the token can further include maintaining, on the computerized device, a list including a set of entries, each entry including an identity and a set of privileges associated with the identity. Either way, outputting the first value when the set of bits has indicated that the computerized device is not authorized to access the datum can include generating a message that the computerized device having an identity represented by the identity bit string is not permitted to receive the datum.

Applying the algorithm to the part of the token can include identifying a set of bits in the part of the token corresponding to a set of privileges in an entry in the maintained list, the set of bits being prespecified by the tokenization server, verifying whether the identity in the entry is the identity represented by the identity bit string and producing the set of bits to form an output of the algorithm. In this case, verifying whether the identity in the entry is the identity represented by the identity bit string can include forming a list of entries having a set of privileges corresponding to the identified set of bits in the part of the token, compiling a list of identities from the list of entries and verifying whether the identity represented by the identity bit string matches an identity in the list of identities.

A further embodiment to the stated problem is a computer program product which includes a non-transitory computer readable storage medium storing code, when executed by a computer, causes the computer to impose access control policies. The code includes instructions to receive a token which is associated with a datum by a tokenization server. The code also includes instructions to generate, apart from the tokenization server, an access control result based on at least a portion of the token. The code is also configured to generate, apart from the tokenization server, an access control result based on at least a portion of the token. The code further includes instructions to impose a first access control policy which includes refraining from sending an access request to the tokenization server when the access control result has a first value and a second access control policy which includes sending an access request to the tokenization server, the access request being constructed and arranged to request access to the datum when the access control result has a second value which is different from the first value.

Implementations are directed to the following.

Generating the access control result based on at least the portion of the token can include deriving a set of bits from application of an algorithm to a part of the token and outputting the first value when the set of bits has indicated that the computerized device is not authorized to access the datum and otherwise outputting the second value. In this case, deriving the set of bits from application of the algorithm to the part of the token can include inputting a set of parameters including an identity bit string representing an identity of the computerized device into the algorithm and producing the set of bits from an output of the algorithm. In some situations, the set of parameters can further include a privilege bit string representing a set of privileges into the algorithm, each privilege in the set of privileges representing an action on the datum. In other situations, deriving the set of bits from application of the algorithm to the part of the token can further include maintaining, on the computerized device, a list including a set of entries, each entry including an identity and a set of privileges associated with the identity. Either way, outputting the first value when the set of bits has indicated that the computerized device is not authorized to access the datum can include generating a message that the computerized device having an identity represented by the identity bit string is not permitted to receive the datum.

Applying the algorithm to the part of the token can include identifying a set of bits in the part of the token corresponding to a set of privileges in an entry in the maintained list, the set of bits being prespecified by the tokenization server, verifying whether the identity in the entry is the identity represented by the identity bit string and producing the set of bits to form an output of the algorithm. In this case, verifying whether the identity in the entry is the identity represented by the identity bit string can include forming a list of entries having a set of privileges corresponding to the identified set of bits in the part of the token, compiling a list of identities from the list of entries and verifying whether the identity represented by the identity bit string matches an identity in the list of identities.

A further embodiment to the stated problem is a a technique of imposing access control policies on a datum which includes a first set of bits satisfying a first set of constraints and is received at a computer from a client able to compute a hash function which takes as input a set of index bits. The technique includes producing upon receipt of a tokenization request and a bit string representing a set of users on the client having access privileges to the datum, a token corresponding to the datum, the token including a second set of bits distinct from the first set of bits, the second set of bits including a set of codeword bits configured to be subdivided into index bits and a set of message authentication code (MAC) bits according to values of bits in the bit string, an application of the hash function on the index bits resulting in the MAC bits. The technique also includes storing in a database entry on a database, the datum the corresponding token and the bit string, the database entry having an address within the database. The technique further includes sending the token to the client, the client enabled to verify, using the hash function and the second set of bits, whether a user from the set of users on the client has access privileges to the datum, the verification being performed apart from the database.

Implementations are directed to the following.

The computer and client can possess a cryptographic key. In this case, producing a token corresponding to the datum includes assigning the hash function to take the value of a keyed hash function which takes the cryptographic key as input.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique of imposing access control policies reduces an amount of ACL-related inquiries serviced by a Tokenization Server and reduces the risk of divergence between intended access privileges and those actually enforced by allowing a system having a token to determine whether it is authorized to access data associated with the token. The improved technique reduces the amount of workload on the Tokenization Server while maintaining the same level of security as traditional tokenization architecture.

Figure 1:
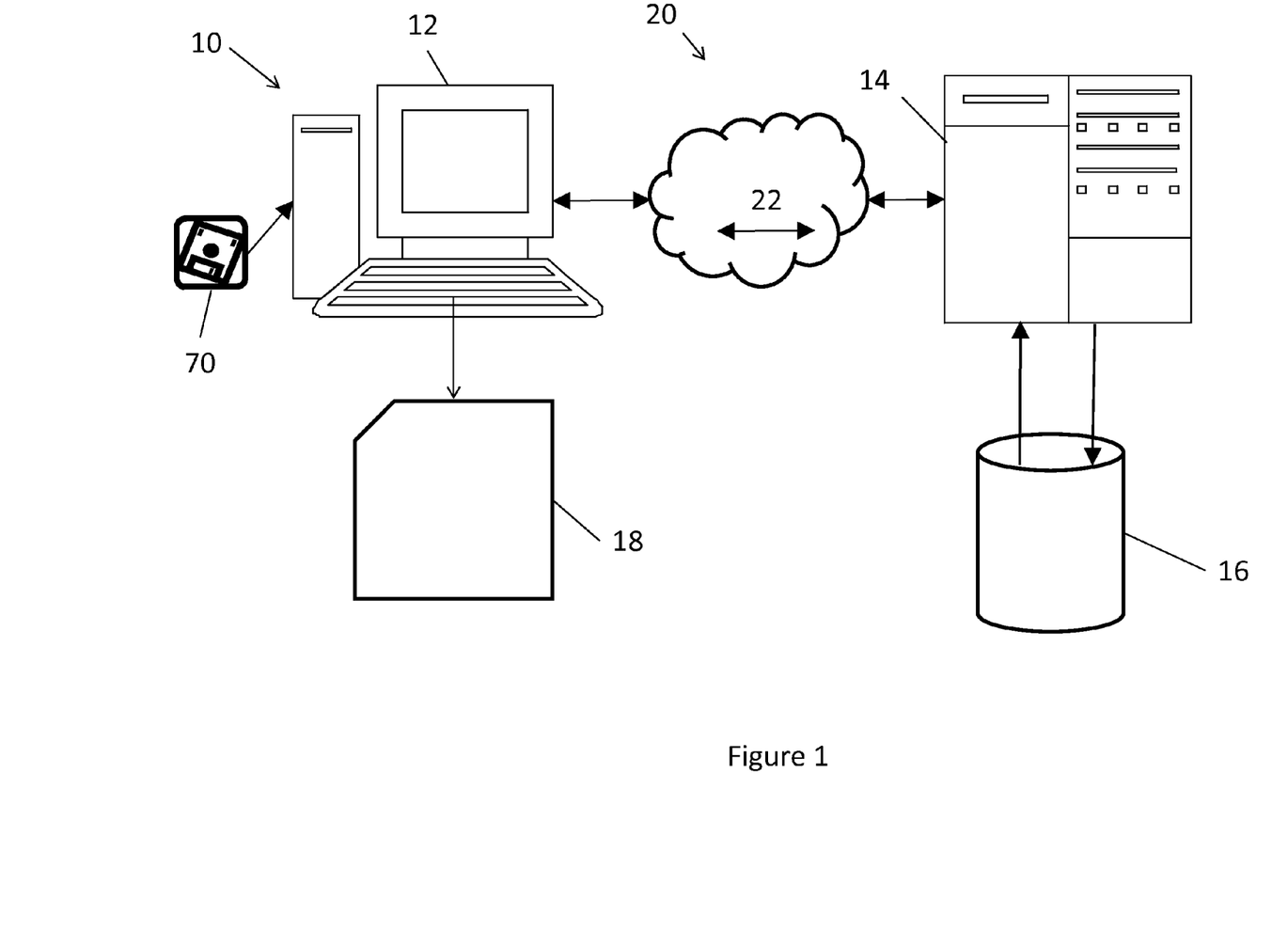
FIG. 1 is a block diagram of an electronic environment configured to implement the improved technique of imposing access control policies.

FIG. 1 shows an electronic environment 10 which is suitable for use by the improved technique. The electronic environment includes a client 12, a Tokenization Server 14, a database 16, and a communications medium 20. Client 12 is connected to Tokenization server 14 through communications medium 20.

Communications medium 20 conveys electronic communications 22 between the components of electronic environment 10. Communications medium 20 is illustrated as a cloud because it is capable of having a variety of topologies including hub-and-spoke, backbone, loop, irregular, a combination of the Internet and LAN(s), combinations thereof, and so on.

Client 12 is a computer system having a processor and non-volatile storage, accessed by a user. Client 12 includes, for example, a data loss prevention (DLP) system. Such a DLP system may be standalone or embedded within, e.g., a point-of-sale (POS) system. For example, at a POS system, an initial value is produced by, e.g., swiping a credit card. In such a case, the initial value takes the form of 16-digit credit card number. For practical, e.g., risk mitigation, reasons, client 12 is not to be in possession of, or have direct access to, the set of initial values. Suppose that client 12 can store a set of credit card numbers taken throughout a single day: client 12 would then send the set of credit card numbers to a safe location at the end of the day, along with a request for tokens for each of the credit card numbers in the set. Client 12 further includes a network interface to send and receive electronic communications 22 over communications medium 20.

Client 12 is capable of sending numerous requests for access to credit card numbers over communications medium 20. Large volumes of such requests can slow down electronic communications 22 within communications medium 20. As will be described below, electronic environment 10 is configured to enable client 12 to self-determine whether many of those requests are to be sent by embedding information concerning authorization to access the credit card numbers within tokens sent to client 12 in place of the credit card numbers.

Tokenization Server 14, which produces the tokens and sends them to client 12, includes a network interface configured to receive electronic communications 22 over communications medium 20. Electronic communications 22 includes initial values with corresponding requests for tokenization from client 12. As will be described below, embedded within a request for tokenization would be a listing of the types of entities which may access the corresponding initial value.

Tokenization Server 14 further includes a processor configured to produce tokens. Tokens are produced, for example, from a computer program product executed by the processor on Tokenization Server 14. Tokenization Server 14 is further configured to receive, e.g., over communications medium 20, external data configured to define characteristics of tokens produced by the processor. Information concerning the credit card numbers and their associated tokens are stored in a medium accessible to Tokenization Server 14.

Database 16, which stores this information, is connected to Tokenization Server 14 and includes a non-volatile storage medium configured to store database entries. Access to database entries within database 16 is controlled by, e.g., Tokenization Server 14 in such a way that only those requests for access having a proper authorization may be satisfied. Tokenization Server 14 verifies proper authorization by referring to the information stored in database entries within database 16, as will be described below.

Figure 2:
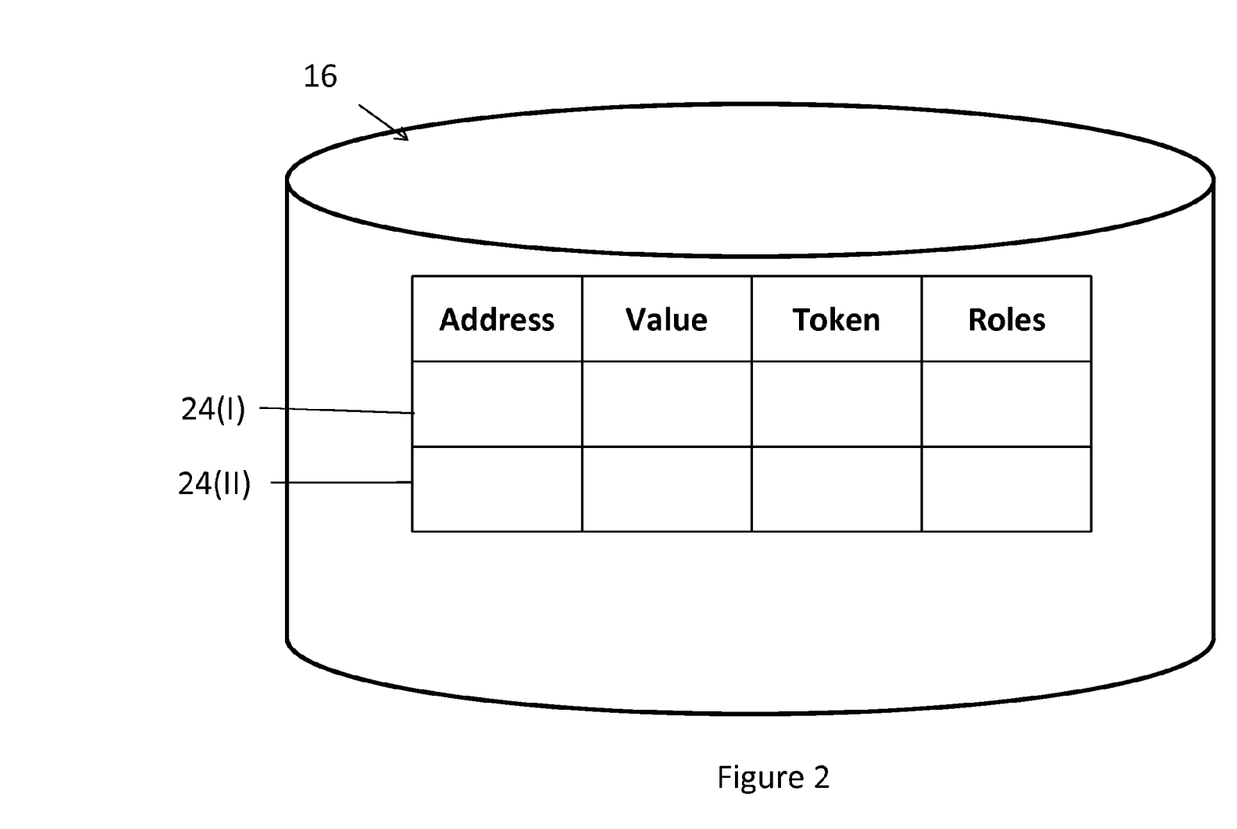
FIG. 2 is a block diagram of database entries on a database in the electronic environment of FIG. 1.

FIG. 2 illustrates a sample of database entries within database 16. Database entries 24(I), 24(II), . . . (i.e., database entries 24) each include an initial value and a token. Database entries 24 also include an address. A lookup operation can then reference a database entry 24 by matching, e.g., a pointer to the address.

Database entries 24 each further include an access type. An access type represents, for example, type of system that is authorized to access the initial value in the database entry. The access type can take the form of a bit string having a length of, e.g., 2 bits. Suppose that the bit string '11' can represent entities authorized to access the credit card number represented as the initial value in the database entry, while '00', '01', and '10' would not be permitted access. As will be described below, these bit strings can represent types of entities using client 12 that may request access to the initial value corresponding to the access type and token in the database entry, and a way to embed information about access authorization within a token is to create a mapping between the access type and specific entities on client 12 that wish to access the initial value.

Each bit in the bit string representing an access can also represent a privilege. Suppose that a bit string '11' can represent entities that are allowed to access a credit card number and replace the credit card number with another credit card number. On the other hand, the bit string '10' would represent entities that are allowed to access a credit card number but not allowed to replace the credit card number with another credit card number. Each bit string can be mapped to a group of entities having various access privileges, and using these bit strings, information concerning the access privileges can be encoded within a token.

One such entity that may seek access to initial values associated with tokens is a particular user having access to client 12. Each user has a unique identifier known only to the user and a system administrator, e.g., a username and password combination. The identifier is associated with a group, herein known as an access group, of identifiers that possess similar authorization rights, such as particular access privileges with respect to the initial data. A record of such authorization rights forms a mapping between an identifier and an access group.

Figure 3:
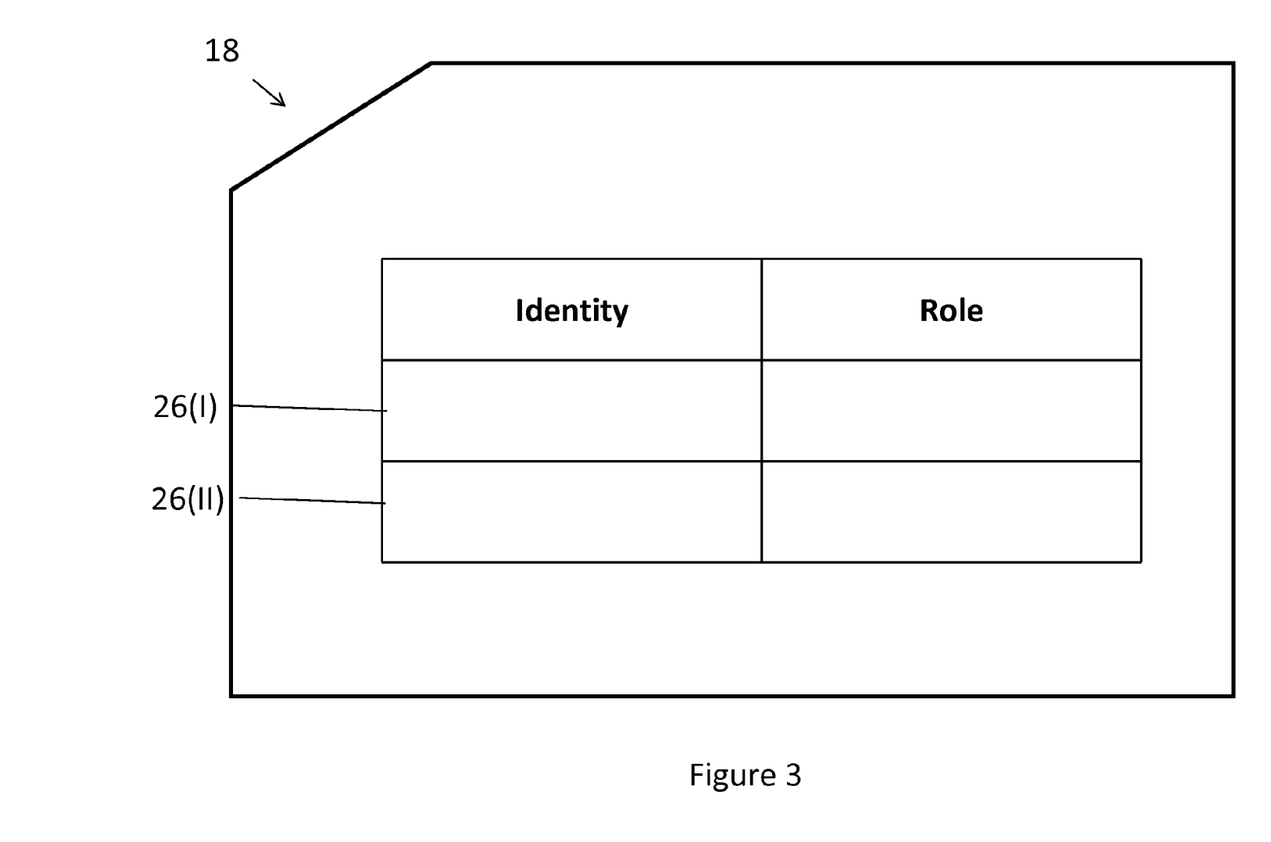
FIG. 3 is a block diagram of a list of entries including an identity and a set of privileges associated with the identity in the electronic environment of FIG. 1.

FIG. 3 illustrates such a record 18 stored on client 12 having entries 26(I), 26(II), . . . (i.e., entries 26). Each entry 26 includes an identifier and an access group. Each identifier can have more than one access group with which it is associated. Conversely, each access group can have more than one identifier with which it is associated.

Record 18 is stored on a non-volatile storage medium connected to client 12. To ensure that only those with proper authorization are permitted access to the initial values secured in database 16, write access to record 18 is protected and limited to a system administrator. This way, decisions about access to initial values are made at client 12. Further, as mentioned previously, client 12 sends access authorization information concerning an initial value to Tokenization Server 14 with a request for tokenization.

During operation, after Tokenization Server 14 receives the initial value and request for tokenization, client 12 receives a token from Tokenization Server 14. If a user has a query about an authorization to access the initial value associated with the token, client 12 applies a mathematical function to the token to verify whether the user is currently authorized to access an initial value associated with the token. The mathematical function can be configured to output one of two possible results (e.g., a bit value) representing an access control policy. If the mathematical function outputs a first value, then client 12 does not possess an authorization to access the initial value associated with the token. In this case, no further inquiries to Tokenization Server 14 concerning access control are necessary. On the other hand, if the mathematical function outputs a second value different form the first value, then nothing further can be deduced about access control from the token. In this case, if client 12 needed to know whether it was authorized to access the initial value associated with the token, then it would need to send an inquiry to Tokenization Server 14.

As stated previously, a benefit of locally evaluating a token in this manner is that traffic within communications medium 20 and the load on Tokenization Server 14 is reduced. Many of those who have no authorization to access a token will be stopped from contacting Tokenization Server 14. Further, such a method provides less risk of a mismatch between an identifier and an authorization, as bits may be lost in communication medium 20.

The initial value associated with the token typically needs to satisfy some constraint so that a system handling a transaction involving the initial value can be reasonably sure that the initial value is not fraudulent or simply contains an error. For example, credit card numbers typically contain a check digit computed using the Luhn algorithm. That is, a credit card number, when subjected to the Luhn algorithm, needs to be, e.g., congruent modulo some prespecified number. A number resembling a credit card number that did not satisfy such a congruence upon application of the Luhn algorithm would be identified as an invalid number.

The token includes a set of bits distinct from the set of bits included in its corresponding initial value. On the other hand, for the purpose of enhancing security, for example, the token and the initial value have the same number of bits. When the token and the initial value have the same number of bits, it is difficult for anyone accessing data on client 12 to determine whether the data is a token or an initial value. For example, one could run data through a test such as a test involving the Luhn algorithm as described above. Nevertheless, tokens generated by Tokenization Server 14 can be constrained to pass such a test in the same way initial values are constrained. That is, Tokenization Server 14 in allocating bits for a token, sets aside a number of bits to form a set of check bits. The check bits are set so that the token satisfies the same constraint as the initial value. Such a constraint makes it very difficult for an unauthorized user on client 12 to distinguish between initial values and tokens.

The token, however, must differentiate itself from a credit card number by satisfying an additional constraint or set of constraints which a randomly-chosen credit card number would not necessarily satisfy. Some token self-identification techniques which are suitable for use in the electronic environment 20 are described in U.S. application Ser. No. 12/826,466, filed on even date herewith, entitled "SELF-IDENTIFICATION OF TOKENS", the teachings of which are hereby incorporated by reference in their entirety. One solution to this problem involves Tokenization Sever 14 extracting a set of codeword bits from the bits allocated for a token. The codeword bits communicate to an authorized user of client 12 about the validity of a received token. To accomplish this, the set of codeword bits are split into a set of index bits and a set of message authentication code (MAC) bits. The values of bits in the set of index bits are defined to allow for lookups in database 16 by Tokenization Server 14. That is, the values of bits in the set of index bits are set in relation to an address of a database entry 24. The values of the bits in the set of MAC bits are set according to a hash function applied to the set of index bits. The set of MAC bits are then concatenated with the set of index bits to form the set of codeword bits. The set of codeword bits then make up a part the set of bits belonging to the token.

Once client 12 receives the token, client 12 performs the same extraction of codeword bits from the token and subdivision of codeword bits into index bits and MAC bits. If client 12 has access to the same hash function as was used to generate the MAC bits in the token, then an application of the hash function to the index bits should reproduce the MAC bits. If the application of the hash function does reproduce the MAC bits, then client 12 has verified the validity of the token.

The hash function can be a keyed hash function which requires possession of a cryptographic key for evaluation of the value of the hash function as applied to the index bits. Furthermore, a keyed function that is not a hash function, such as an encryption scheme, may be used in place of a hash function.

Further, client 12 may have a need to retain some information related to each initial value to be sent to Tokenization Sever 14. For example, client 12 may need to keep the last four digits of a credit card number as part of a marketing campaign or in order to be able to contact a customer regarding a transaction. One way to satisfy this need is for Tokenization Sever 14 to allocate a number of bits to form a set of hold bits. The set of hold bits in the token could be set to be identical to corresponding bits in the initial value, e.g., the bits corresponding to the last four digits of a credit card number. More generally, the bits in the set of hold bits are defined through an external padding function which defines, e.g., the particular bits from the token that are to form the set of hold bits. The external padding function can further define a relationship between the bits in the set of hold bits and corresponding bits in the initial value. For example, all bits in the hold bits can have values set to 1, or values set equal to values of the corresponding bits in the initial value.

One detail that can provide an additional level of flexibility lies in the dividing of the set of codeword bits into the set of index bits and the set of MAC bits. Such a dividing can be done according to a predefined scheme known to both Tokenization Server 14 and client 12. An alternative way, however, is for Tokenization Server 14 to send a set of control bits that define instructions as to which bits in the set of bits in the token belong to the set of MAC bits and which belong to the set of index bits.

As an example, consider a token that must satisfy the following constraint imposed by the initial value, which takes the form of a 16 decimal digit credit card number: hhhh xxxx xxxx xxxc, where hhhh indicates set of hold bits whose values are to be held fixed in the generation of the token from the initial value, x values may be any digit 0-9, and the c value is a check digit computed using the Luhn algorithm. In this example, the codeword can consume up to 11 decimal digits, or 11 $\log_2 10 \approx 37$ bits. A control bit can be used to define a subdivision of the codeword into a 16-bit index and a 21-bit MAC.

The set of control bits can be used to encode information concerning access control of the initial data within the token. For example, a set of control bits taking the form of the bit string '10' can be used to divide up a 37-bit codeword as described above. As also described above, the bit string '10' can be used to identify a group of systems that can access the credit card number associated with the token containing the control bits. At client 12, this implies that an operation that determines whether a user belonging to an access group on client 12 can access a credit card number associated with a particular token can take the form of client 12 verifying whether operating on a set of index bits in the token using a hash function matches the set of MAC bits in the token. That is, depending on an access group, a token can satisfy any one of a number of different sets of constraints.

Figure 4:
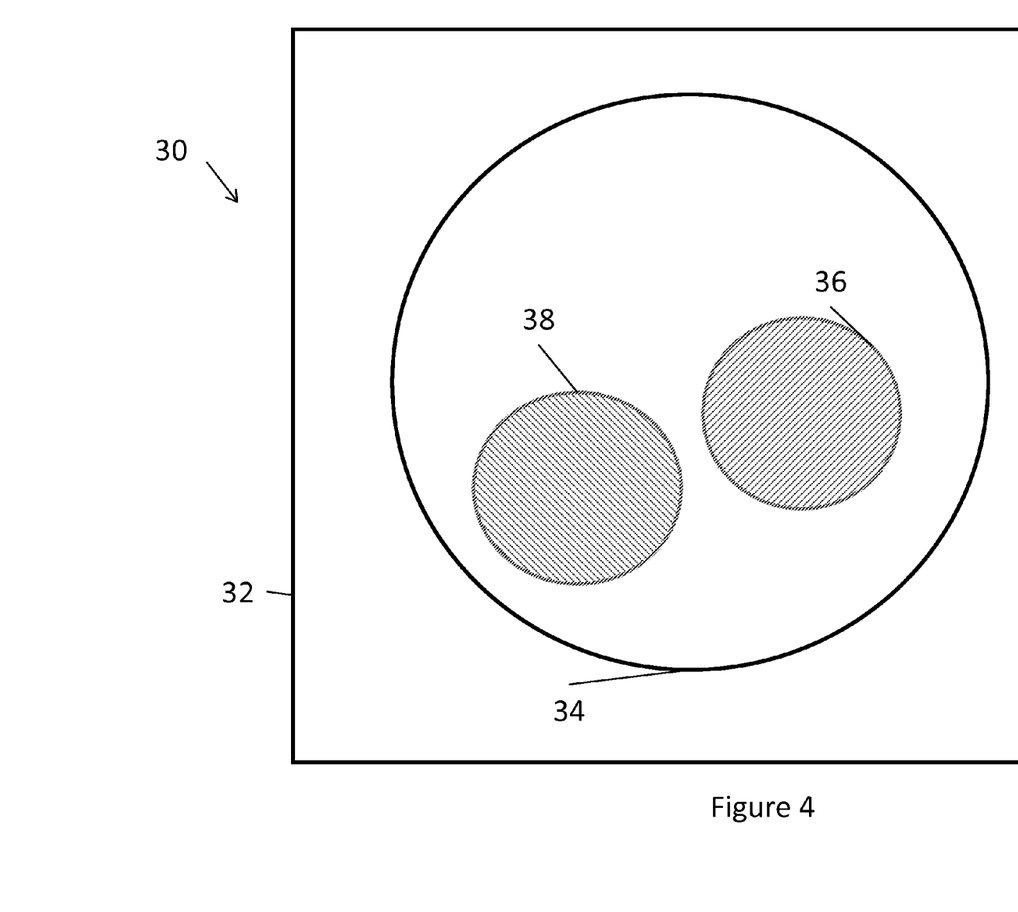
FIG. 4 is a block diagram of an access function used in the improved technique illustrated in FIG. 1.

FIG. 4 geometrically illustrates a relationship 30 between the constraints satisfied by an initial value and those satisfied by a token. Region 32 represents, for example, the set of all possible 16-digit numbers. Inside region 32 is region 34, a subset of all possible 16-digit numbers, which represents the set of valid credit card numbers, which in turn are 16-digit numbers satisfying particular standard credit card requirements, e.g., a congruent modulus requirement with respect to some prespecified number (e.g., 10) upon application of the Luhn algorithm. Contained within region 34 is region 36, which represents a set of valid tokens, which is a subset of the set of valid credit card numbers.

The set of valid tokens corresponding to authorized access to an initial value, however, satisfies both the first set of constraints and a second set of constraints. The second set of constraints is representative of a particular access group, e.g., the group of users that have authorization to access a credit card number. That is, the control bits in a token dictate how the token is split into index bits and MAC bits at Tokenization Server 14. Thus, the second set of constraints dictates that the hash function applied to a first set of index bits resulting from splitting the codeword into index bits and MAC bits at, say, the $16^{th}$ bit as in the example above, reproduces the set of MAC bits.

Alongside this second set of constraints is another set of constraints corresponding to those users that do not have authorization to access the credit card number. As geometrically illustrated in FIG. 4, region 38 represents a set that satisfies a separate set of constraints contained within the set of valid credit card numbers. Region 38 would then represent those tokens whose index bits and MAC bits are split at, say, the $14^{th}$ bit rather than the $16^{th}$ bit as in the example above. Application of a hash function expecting a 16-bit index but receiving a 14-bit index would find a mismatch between the hash function output and the MAC bits. In such a case, the mismatch would correspond to a denial of access.

As illustrated in the example described above, the decomposition of the token into control bits and codeword bits is a particular algorithm acting on a token with output used to verify authorization to access an initial value such as a credit card number. The output of the algorithm, however, can depend on more than the token. For example, client 12, as described above, can support many users, each user having a unique identifier such as a username and password combination. The identifier corresponding to a user on client 12 can then be passed to the algorithm as an input parameter to verify whether the particular user having the identifier has access to the initial value associated with the token.

In some situations, the output of the algorithm can depend on the input of further parameters. One such parameter, in addition to the identifier, is a set of privileges. As described above, a set of privileges is represented by a bit string, say '11'. For example, a bit string '11' can represent systems that are allowed to both access a credit card number and replace the credit card number with another credit card number. The identifier corresponding to a user on client 12 as well as a bit string representing a set of privileges can then be passed to the algorithm as a set of input parameters to verify whether the particular user having the identifier has the particular privilege access to the initial value associated with the token as specified by the set of privileges.

In further situations, users of client 12 belong to access groups that associate a set of privileges with an identifier. That is, there exists a mapping between a user and a set of privileges for a given token or set of tokens. Such a mapping can be found on record 18 as illustrated in FIG. 3. Under the "access group" heading is the set of privileges for a given user. The mapping can be valid for all tokens, a subset of the tokens, or a particular token. In such a case, the algorithm would take as input, for example, an identifier associated with a user, and would know to access record 18 to further pass in as input the set of privileges associated with the user.

The algorithm, upon passing in input parameters, then evaluates access authorization using the input parameters and the token. One method of evaluating the access authorization was described above in using a decomposition of the codeword into index bits and MAC bits and verifying that a hash function applied to the index bits reproduced the MAC bits. Other evaluation methods are available. One such method assumes that the values of the bits in the set of control bits are equal to the values of the bits in a bit string describing an access group in record 18. The algorithm would then identify this set of control bits from the token. The algorithm would then perform a lookup in entries 26 in record 18 of all identifiers having an access group matching the set of control bits. An output of the algorithm would then depend whether the identifier was found in the resulting set of matching access groups.

Figure 5:
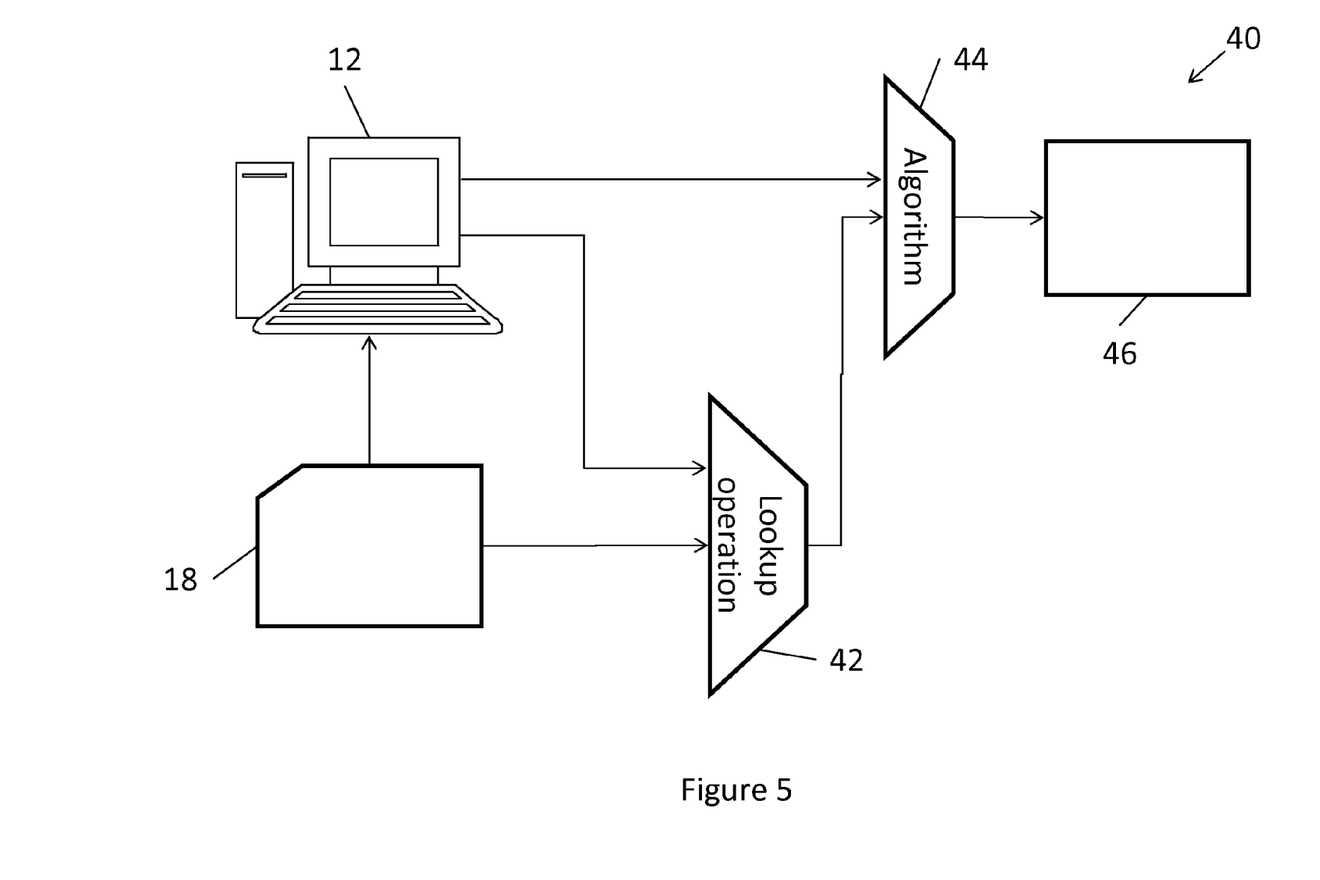
FIG. 5 is a block diagram of sets of constraints used in the improved technique illustrated in FIG. 1.

FIG. 5 illustrates a system 40 having such an algorithm which enables a verification of access authorization on client 12 from a particular token corresponding to a credit card number and the list 18 of users and corresponding access groups. A user having an identifier wishes to query access authority with respect to a token on client 12. Information about the user's access privileges is stored in list 18. Client 12 performs a lookup 42 on record 18 with respect to the identifier with the results being a pairing of the identifier and all access groups to which the user having the identifier belongs. This pairing is then input into an algorithm 44 along with the token in order to verify whether the user has the access privileges to the credit card number associated with the token. The output of the algorithm is sent to a display 46 on client 12.

The output of the algorithm can take various forms. For example, the output can take the form of a single bit, in which '0' can represent no access authority. The output can further take the form of a message to the particular user concerning access authority. The message can result from a set of bits produced by the algorithm, e.g., whether the identifier was found in a resulting set of matching access groups.

Output to a particular class of users, however, can be complicated by a suspected malicious intent. For example, repeated inquiries about access to a particular credit card number may arouse such suspicion. In such a case, an alternative measure to a simple 'yes' or 'no' answer regarding access authorization may be needed. A third output value, then, distinct from the first value and the second value would then provide a signal to Tokenization Server 14 that a particular user has made more than a threshold number of inquiries about access for a particular token. Tokenization Server 14 can then take action concerning that particular user, for example, locking the user from access to any credit card number.

Figure 6:
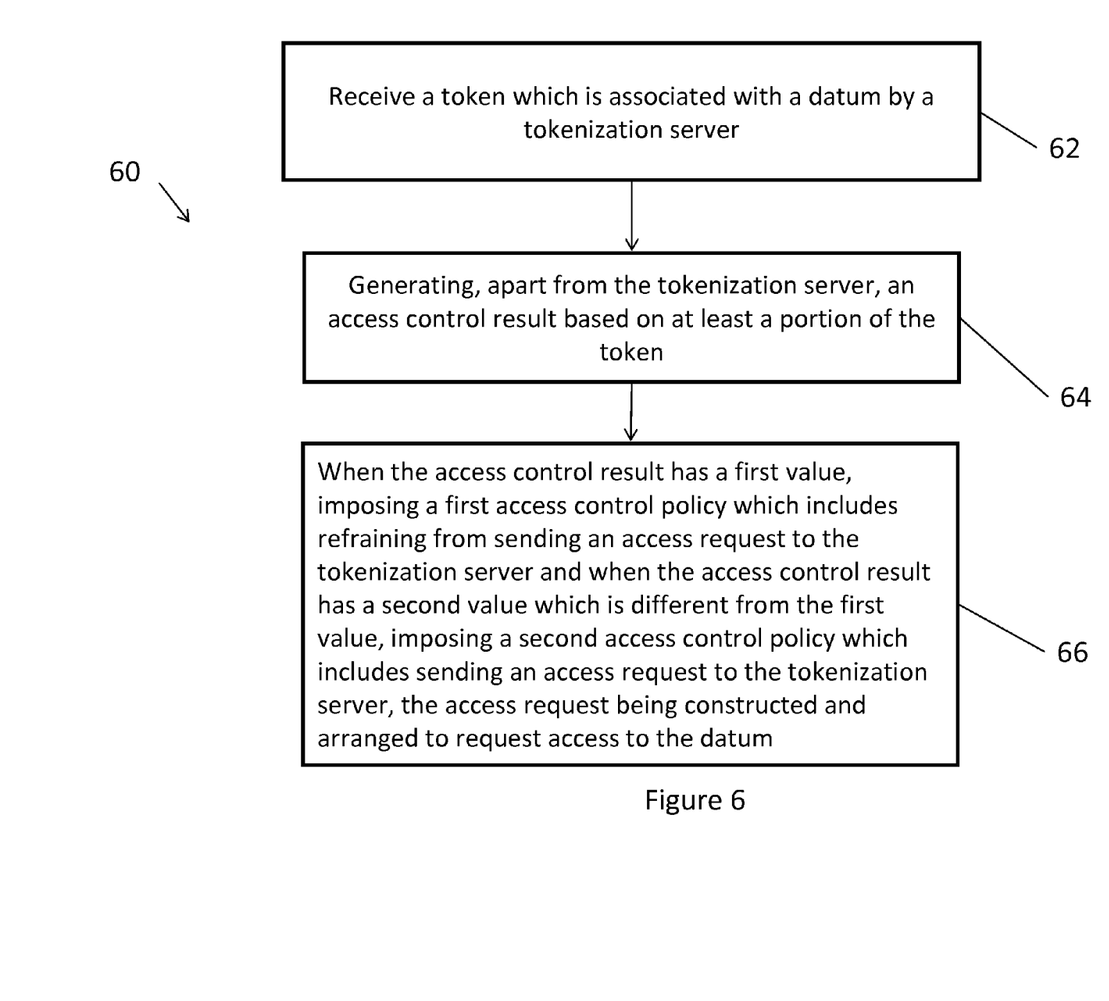
FIG. 6 is a flow chart outlining the improved technique of imposing access control policies.

FIG. 6 illustrates a method 60 of imposing access control policies as carried out in the system described above. A token which is associated with a datum by a server is received 62 at a computerized device. An access control result based on at least a portion of the token is generated 64 apart from the server. When the access control result has a first value, a first access control policy which includes refraining from sending an access request to the tokenization server is imposed 66. When the access control result has a second value which is different from the first value, a second access control policy which includes sending an access request to the tokenization server, the access request being constructed and arranged to request access to the datum is imposed 66.

The token received 62 at the computerized device corresponds to a datum which can be, e.g., a credit card number. The receiving 62 of the token at the computerized device can take place at a network interface on the computerized device, where the network interface receives electronic communications from a communications medium.

The access control result is generated 64 by the computerized device and apart from the server. Access control policies can be embedded within a token associated with a credit card number. The token and any other relevant information, such as user identifiers and associated privilege levels, may be input into an algorithm that determines the access control policy.

An output of the algorithm imposes 66 an access control policy. If the output takes on a first value, then the authorization level associated with the user is such that no further communication with the server is needed. If the output takes a second value different from the first, however, further communication with the server is needed in order to produce an access authorization associated with the user.

While various embodiments of the invention have been particularly shown and described, it will be understood by those skilled in the art that various changes in form and details may be made therein without departing from the spirit and scope of the invention as defined by the appended claims.

In some arrangements, client 12 is associated with a user having an identifier. On the other hand, the identifier need not be associated with a particular human user, but with a particular subsystem within the system defining client 12. For example, a POS system may take on one identifier having a particular role and, with that role, access privileges associated with the identifier.

Further, it should be understood that tokens as implemented within electronic environment 20 can be used for an automated detection of potentially sensitive data and transforming actual sensitive data to tokens. Some techniques of automated detection of defined input values and transformation to tokens which are suitable for use in the electronic environment 20 are described in U.S. application Ser. No. 12/826,491, filed on even date herewith (Attorney Docket 1048-052), entitled "AUTOMATED DETECTION OF DEFINED INPUT VALUES AND TRANSFORMATION TO TOKENS", the teachings of which are hereby incorporated by reference in their entirety.

For example, it should be understood that some embodiments are directed to an electronic environment which utilizes systems that protect sensitive data. Some embodiments are directed to Tokenization Server 14. Some embodiments are directed to a system which imposes access control policies. Some embodiments are directed to a process of imposing access control policies. Also, some embodiments are directed to a computer program product which enables computer logic to impose access control policies.

In some arrangements, the improved technique is implemented on client 12 by a set of processors or other types of control/processing circuitry running software. In such arrangements, the software instructions can be delivered to client 12 in the form of a computer program product 70 (illustrated generally by a diskette icon 70 in FIG. 1) having a computer readable storage medium which stores the instructions in a non-volatile manner. Examples of suitable computer readable storage media include tangible articles of manufacture and apparatus such as CD-ROM, flash memory, disk memory, tape memory, and the like.

What is claimed is:

1. In a computerized device, a method of imposing access control policies, the method comprising:
   receiving, by the computerized device, a token which is associated with a datum by a tokenization server;
   generating, by the computerized device and apart from the tokenization server, an access control result based on at least a portion of the token;
   when the access control result has a first value, imposing, by the computerized device, a first access control policy which includes refraining from sending an access request to the tokenization server; and
   when the access control result has a second value which is different from the first value, imposing, by the computerized device, a second access control policy which includes sending an access request to the tokenization server, the access request being constructed and arranged to request access to the datum;
   wherein the datum is a discrete data element satisfying a checksum;
   wherein receiving the token which is associated with the datum includes:
      acquiring, as at least a part of the token, a set of bits satisfying the checksum, the set of bits including a first subset and a second subset; and
      performing a verification operation configured to verify that an operation of a hash function on the first subset reproduces the second subset; and
   wherein the set of bits further includes a set of hold bits, each hold bit in the set of hold bits having a value equal to a corresponding bit in the discrete data element.

2. A computer-implemented method as in claim 1,
   wherein the first subset of the set of bits includes a set of MAC bits whose values are set according to the hash function of the second subset of the set of bits, which includes a set of index bits whose values are set in relation to a database entry;
   wherein the method further comprises:
      receiving a set of control bits from the tokenization server, values of the set of control bits being indicative as to which bits of the set of bits belong to the set of MAC bits and the set of index bits.

3. A computer-implemented method as in claim 1, wherein performing the verification operation includes:
   subdividing, based on a set of control bits within the set of bits, the set of bits into the first subset of the set of bits and the second subset of the set of bits;
   wherein the set of control bits are based on the access control result.

4. A computer-implemented method as in claim 1, further comprising:
when the access control result has a third value which is different from the first value and the second value, imposing, by the computerized device, a third access control policy which includes sending an alert to the tokenization server, the alert being constructed and arranged to prevent access of the sensitive data by the computerized device.

5. A computer-implemented method as in claim 1, wherein generating the access control result based on at least the portion of the token includes:
deriving a set of bits from application of an algorithm to a part of the token, and
outputting the first value when the set of bits has indicated that the computerized device is not authorized to access the datum and otherwise outputting the second value.

6. A computer-implemented method as in claim 5, wherein deriving the set of bits from application of the algorithm to the part of the token includes:
inputting a set of parameters including an identity bit string representing an identity of the computerized device into the algorithm, and
producing the set of bits from an output of the algorithm; and
wherein outputting the first value when the set of bits has indicated that the computerized device is not authorized to access the datum includes:
generating a message that the computerized device having an identity represented by the identity bit string is not permitted to receive the datum.

7. A computer-implemented method as in claim 6, wherein the set of parameters further includes a privilege bit string representing a set of privileges into the algorithm, each privilege in the set of privileges representing an action on the datum;
wherein outputting the first value when the set of bits has indicated that the computerized device is not authorized to access the datum includes:
generating a message that the computerized device having an identity represented by the identity bit string is not permitted to perform actions on the datum represented by the privilege bit string.

8. A computer-implemented method as in claim 6, wherein deriving the set of bits from application of the algorithm to the part of the token further includes:
maintaining, on the computerized device, a list including a set of entries, each entry including an identity and a set of privileges associated with the identity; and
wherein outputting the first value when the set of bits has indicated that the computerized device is not authorized to access the datum includes:
generating a message that the computerized device having the identity represented by the identity bit string is not permitted to perform actions on the datum represented by its associated set of privileges.

9. A computer-implemented method as in claim 8, wherein applying the algorithm to the part of the token includes:
identifying a set of bits in the part of the token corresponding to a set of privileges in an entry in the maintained list, the set of bits being prespecified by the tokenization server;
verifying whether the identity in the entry is the identity represented by the identity bit string; and
producing the set of bits to form an output of the algorithm.

10. A computer-implemented method as in claim 9, wherein verifying whether the identity in the entry is the identity represented by the identity bit string includes:
forming a list of entries having a set of privileges corresponding to the identified set of bits in the part of the token;
compiling a list of identities from the list of entries; and
verifying whether the identity represented by the identity bit string matches an identity in the list of identities.

11. A computerized device configured to impose access control policies, the computerized device comprising:
a memory;
a network interface; and
a processor configured to:
receive, at the network interface, a token which is associated with a datum by a tokenization server;
generate, apart from the tokenization server, an access control result based on at least a portion of the token; and
when the access control result has a first value, impose a first access control policy which includes refraining from sending an access request to the tokenization server; and
when the access control result has a second value which is different from the first value, impose a second access control policy which includes sending an access request to the tokenization server, the access request being constructed and arranged to request access to the datum;
wherein the datum is a discrete data element satisfying a checksum;
wherein receiving the token which is associated with the datum includes:
acquiring, as at least a part of the token, a set of bits satisfying the checksum, the set of bits including a first subset and a second subset; and
performing a verification operation configured to verify that an operation of a hash function on the first subset reproduces the second subset; and
wherein the set of bits further includes a set of hold bits, each hold bit in the set of hold bits having a value equal to a corresponding bit in the discrete data element.

12. A computerized device as in claim 11, wherein generating the access control result based on at least the portion of the token includes:
deriving the set of bits from application of an algorithm to a part of the token, and
outputting the first value when the set of bits has indicated that the computerized device is not authorized to access the datum and otherwise outputting the second value.

13. A computerized device as in claim 12, wherein deriving the set of bits from application of the algorithm to the part of the token includes:
inputting a set of parameters including an identity bit string representing an identity of the computerized device into the algorithm, and
producing the set of bits from an output of the algorithm; and
wherein outputting the first value when the set of bits has indicated that the computerized device is not authorized to access the datum includes:
generating a message that the computerized device having an identity represented by the identity bit string is not permitted to receive the datum.

14. A computerized device as in claim 13, wherein the set of parameters further includes a privilege bit string representing a set of privileges into the algorithm, each privilege in the set of privileges representing an action on the datum;
wherein outputting the first value when the set of bits has indicated that the computerized device is not authorized to access the datum includes:
generating a message that the computerized device having an identity represented by the identity bit string is not permitted to perform actions on the datum represented by the privilege bit string.

15. A computerized device as in claim 13, wherein deriving the set of bits from application of the algorithm to the part of the token further includes:
maintaining, in the memory, a list including a set of entries, each entry including an identity and a set of privileges associated with the identity; and
wherein outputting the first value when the set of bits has indicated that the computerized device is not authorized to access the datum includes:
generating a message that the computerized device having the identity represented by the identity bit string is not permitted to perform actions on the datum represented by its associated set of privileges.

16. A computerized device as in claim 15, wherein applying the algorithm to the part of the token includes:
identifying a set of bits in the part of the token corresponding to a set of privileges in an entry in the maintained list, the set of bits being prespecified by the tokenization server;
verifying whether the identity in the entry is the identity represented by the identity bit string; and
producing the set of bits to form an output of the algorithm.

17. A computerized device as in claim 16, wherein verifying whether the identity in the entry is the identity represented by the identity bit string includes:
forming a list of entries having a set of privileges corresponding to the identified set of bits in the part of the token;
compiling a list of identities from the list of entries; and
verifying whether the identity represented by the identity bit string matches an identity in the list of identities.

18. A computer program product which includes a non-transitory computer readable storage medium storing code, when executed by a computerized device, causes the computerized device to impose access control policies, the code comprising instructions to:
receive a token which is associated with a datum by a tokenization server;
generate, apart from the tokenization server, an access control result based on at least a portion of the token; and
when the access control result has a first value, impose a first access control policy which includes refraining from sending an access request to the tokenization server; and
when the access control result has a second value which is different from the first value, impose a second access control policy which includes sending an access request to the tokenization server, the access request being constructed and arranged to request access to the datum;
wherein the datum is a discrete data element satisfying a checksum;
wherein receiving the token which is associated with the datum includes:
acquiring, as at least a part of the token, a set of bits satisfying the checksum, the set of bits including a first subset and a second subset; and
performing a verification operation configured to verify that an operation of a hash function on the first subset reproduces the second subset; and
wherein the set of bits further includes a set of hold bits, each hold bit in the set of hold bits having a value equal to a corresponding bit in the discrete data element.

19. A computer program product as in claim 18, wherein generating the access control result based on at least the portion of the token includes:
deriving the set of bits from application of an algorithm to a part of the token, and
outputting the first value when the set of bits has indicated that the computerized device is not authorized to access the datum and otherwise outputting the second value.

20. A computer program product as in claim 19, wherein deriving the set of bits from application of the algorithm to the part of the token includes:
inputting a set of parameters including an identity bit string representing an identity of the computerized device into the algorithm, and
producing the set of bits from an output of the algorithm; and
wherein outputting the first value when the set of bits has indicated that the computerized device is not authorized to access the datum includes:
generating a message that the computerized device having an identity represented by the identity bit string is not permitted to receive the datum.

21. A computer-implemented method of imposing access control on a datum, the datum including a first set of bits satisfying a first set of constraints and received at a computer from a client, the computer-implemented method comprising:
producing, by the computer, upon receipt of a tokenization request and a bit string representing a set of users on the client having access privileges to the datum, a token corresponding to the datum, the token including a second set of bits distinct from the first set of bits, the second set of bits including a set of codeword bits configured to identify authorization privileges for access to the datum according to the bit string;
storing, by the computer in a database entry on a database, the datum, the corresponding token and the bit string, the database entry having an address within the database; and
sending, by the computer, the token to the client, the client enabled to verify, using the set of codeword bits, whether a user from the set of users on the client has access privileges to the datum, the verification being performed apart from the database;
wherein the computer and client are able to compute a hash function which takes as input a set of index bits; and
wherein producing a token corresponding to the datum includes:
subdividing the set of codeword bits into index bits and a set of message authentication code (MAC) bits according to values of bits in the bit string; and
obtaining the values of the MAC bits by applying the hash function on the index bits.

22. A computer-implemented method as in claim 21, wherein the computer and client possess a cryptographic key; and
wherein producing a token corresponding to the datum further includes:
assigning the hash function to take the value of a keyed hash function which takes the cryptographic key as input.

23. A computer-implemented method as in claim 21, wherein producing a token corresponding to the datum includes:

encrypting the codeword bits according to an encryption scheme.

* * * * *